(12) United States Patent  (10) Patent No.: US 8,271,234 B1
Cunningham et al.  (45) Date of Patent: Sep. 18, 2012

(54) SYSTEM FOR SITUATIONAL AWARENESS AND METHOD IMPLEMENTING THE SAME

(75) Inventors: John Cunningham, West Hartford, CT (US); Brett R. Hackleman, Scottsdale, AZ (US)

(73) Assignees: John Cunningham, West Hartford, CT (US); Brett R. Hackleman, Scottsdale, AZ (US)

( * ) Notice: Subject to any disclaimer, the term of this patent is extended or adjusted under 35 U.S.C. 154(b) by 785 days.

(21) Appl. No.: 12/011,749

(22) Filed: Jan. 28, 2008

Related U.S. Application Data

(60) Provisional application No. 60/897,593, filed on Jan. 26, 2007.

(51) Int. Cl.
*G06F 19/00* (2011.01)
(52) U.S. Cl. ...................................................... 702/188
(58) Field of Classification Search .......... 702/182–185, 702/188
See application file for complete search history.

(56) References Cited

U.S. PATENT DOCUMENTS

| | | | |
|---|---|---|---|
| 6,823,714 B2 | 11/2004 | Megerle | |
| 6,941,806 B2 | 9/2005 | Burns et al. | |
| 7,171,312 B2 | 1/2007 | Steinthal et al. | |
| 2002/0120475 A1* | 8/2002 | Morimoto | 705/4 |
| 2004/0164859 A1 | 8/2004 | La Spisa | |
| 2004/0204915 A1* | 10/2004 | Steinthal et al. | 702/188 |
| 2005/0206506 A1 | 9/2005 | Kulesz et al. | |
| 2005/0275532 A1 | 12/2005 | Ferri et al. | |
| 2007/0069885 A1 | 3/2007 | Twitchell, Jr. | |
| 2007/0143079 A1 | 6/2007 | Duxbury et al. | |
| 2008/0012701 A1* | 1/2008 | Kass et al. | 340/539.11 |
| 2008/0186166 A1* | 8/2008 | Zhou et al. | 340/539.13 |
| 2009/0058593 A1* | 3/2009 | Breed | 340/5.2 |

* cited by examiner

*Primary Examiner* — Edward Raymond
(74) *Attorney, Agent, or Firm* — McCormick, Paulding & Huber LLP

(57) ABSTRACT

A system for implementing a situational awareness includes a plurality of data gathering devices for observing the physical environment and transforming observations of physical phenomena into digital information; a plurality of field monitoring units with each of the plurality of units communicating with a corresponding plurality of data gathering devices to obtain data therefrom; and an aggregate monitoring unit communicating with each of the plurality of field monitoring units to monitor and control each of the plurality of field monitoring units and collect and store data from the plurality of data gathering devices.

19 Claims, 11 Drawing Sheets

(7 of 11 Drawing Sheet(s) Filed in Color)

SYSTEM FOR SITUATIONAL AWARENESS AND METHOD IMPLEMENTING THE SAME

CROSS REFERENCE TO RELATED APPLICATIONS

The present application claims priority and incorporates by reference the subject matter in its entirety of provisional application No. 60/897,593 filed on Jan. 26, 2007.

This invention was made with Government support under W56HZV-07-C-0072 awarded by the United States Army. The Government may have certain rights in this invention.

BACKGROUND OF THE INVENTION

1. Technical Field

The present invention relates to detection systems and, more particularly, to detection of hazardous materials and situations.

2. Background Art

Hazardous material response teams are equipped with Chemical, Biological, Radiological, Nuclear, and Explosive (CBRNE) sensors from a variety of vendors. While some of these sensors are cutting-edge, others have been around for decades, originally designed for mounting on tanks on the battlefield. The sensors are usually bulky, have poor or limited connectivity capabilities, and have difficult to read output displays.

Typically, each sensor has a proprietary interface with unique settings and alarm levels, and most require the user to visually check the sensor reading on a periodic basis to build a mental model of any trends observed. The workload associated with managing these devices can quickly distract the response team from other critical aspects of the mission, resulting in increased exposure to dangers and decreased effectiveness.

Additionally, each sensor type may have its own communications mechanism, which increases complexity, cost, power consumption, etc. It also introduces more custom interfaces that must be monitored in the command post, which makes it that much more difficult to plan, train, and deploy in response to CBRNE threats. Because each sensor vendor has a proprietary and closed solution, it is not easy to aggregate multiple sensors into a cohesive system.

Most sensors do not have network connectivity, and may only have local connectivity such as RS-232, IR-DA, or even a line-level output (high/low). Another device must interpret the sensor readings and provide this information to the rest of the network. Often the message specification for communicating with a sensor is proprietary or limited in functionality, making it difficult to fully configure and monitor the sensor.

All of these issues make it difficult to design, deploy, or use sensors. This limits the widespread adoption—especially in situations where they are needed most, such as responding to actual CBRNE threats and protecting public events. Thus, there is a need for better detection and monitoring systems.

SUMMARY OF THE INVENTION

According to the present invention, a system for implementing situational awareness includes a plurality of data gathering devices for observing the physical environment and transforming observations of physical phenomena into digital information; a plurality of field monitoring units with each of the plurality of units communicating with a corresponding plurality of data gathering devices to obtain data therefrom; and an aggregate monitoring unit communicating with each of the plurality of field monitoring units to monitor and control each of the plurality of field monitoring units and collect and store data from the plurality of data gathering devices.

These and other features and advantages of the present invention will become apparent in light of the detailed description on the best mode embodiment thereof, as illustrated in the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF PREFERRED EMBODIMENT

Figure 1:
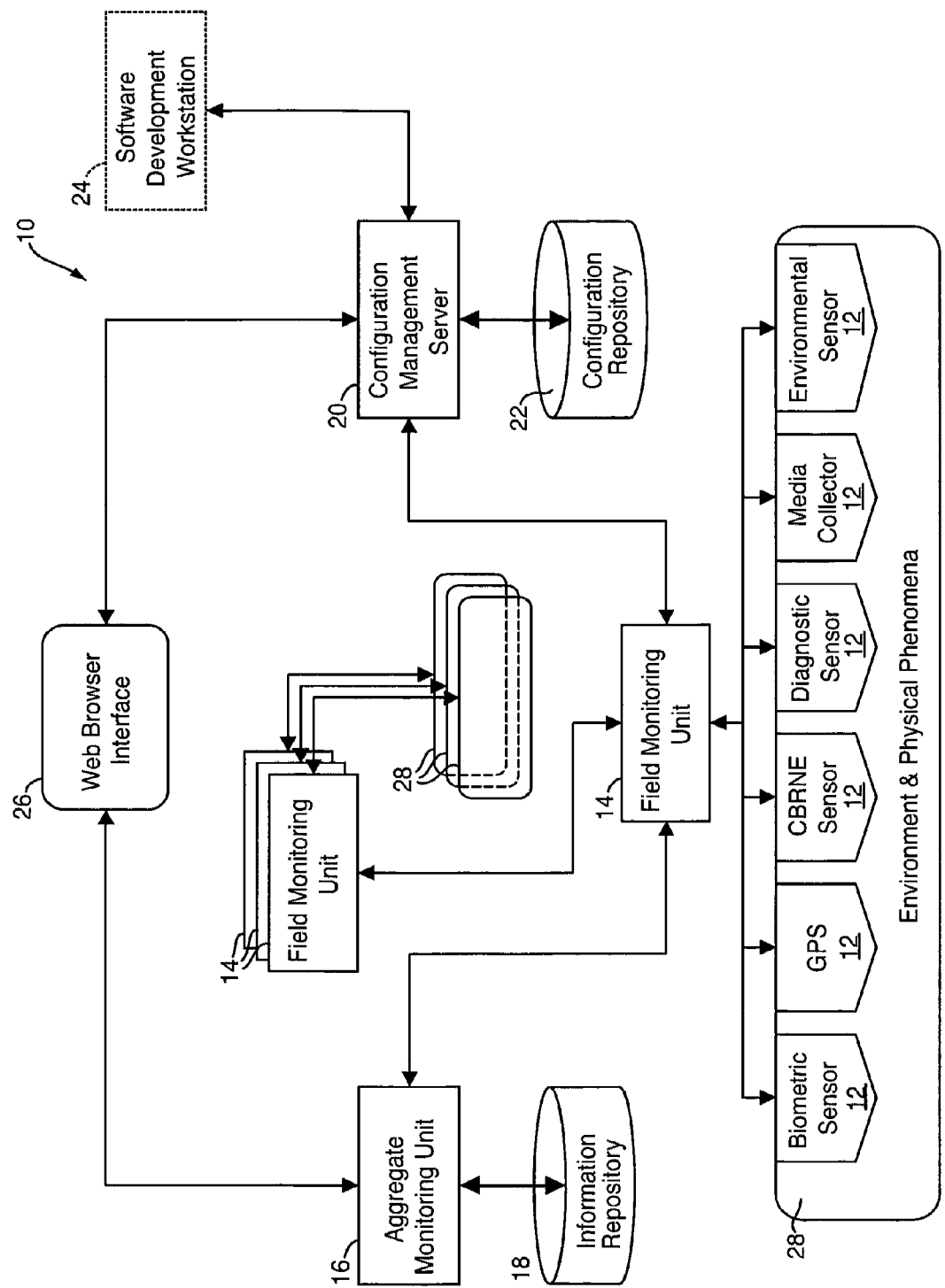
FIG. 1 is a schematic representation of a situational awareness system in accordance with one embodiment of the present invention.

Referring to FIG. 1, a system 10 for implementing sensor reading situational awareness comprises a plurality of data gathering devices 12 for observing elements of the physical environment and transforming these physical observations into digital information for a plurality of field monitoring units 14 that receive information from and maintain communication with the data gathering devices 12. The system 10 further comprises an aggregate monitoring unit 16 for monitoring, controlling, and communicating with the plurality of field monitoring units 14. The aggregate monitoring unit 16 is also in communication with an information repository 18. The system 10 also includes a configuration management server 20 in communication with the plurality of field monitoring units 14 and with a configuration repository 22. In one embodiment of the present invention, the configuration management server 20 of the system 10 is in communication with a software development station 24. The system 10 further includes a web browser interface 26, providing ubiquitous, secure access to both the configuration management server 20 and the aggregate monitoring unit 16.

The plurality of data gathering devices 12 may include a variety of different sensors in a multitude of configurations. Each field monitoring unit 14 is in communication with a set 28 of data gathering devices 12. Each set 28 of data gathering devices 12 may include one or more sensors 12. Each set 28 within the system 10 may be different from any other set and, thus, may include a unique configuration of sensors 12. Alternatively, all field monitoring units 14 may communicate with an identical such set 28 of data gathering devices 12. Various implementations of the system 10 may require different sets 28 of sensors 12.

The data gathering devices 12 may include, but are not limited to, various types of sensors, such as global positioning system (GPS) sensors, hazardous material sensors, biometrics sensors, environmental sensors, diagnostic sensors, and/or media collection sensors. The GPS type sensors provide positioning information associated with each field monitoring unit 14. The hazardous material sensors may include, but are not limited to, sensors detecting presence of hazardous material, for example, chemical gases, biological vectors, radiological emissions, nuclear materials, and/or explosive conditions. Biometrics sensors may include, but are not limited to, monitors of heart rate, breathing rate, body temperature, blood oximetry, hydration levels, blood glucose levels, and/or body movement such as the personal alert safety system (PASS). The environmental conditions that may be monitored include, but are not limited to, temperature, pressure, wind speed, humidity, and/or precipitation sensors.

The data gathering sensors 12 are either physically attached to the field monitoring unit 14 or can be in either long range or short-range wireless communication therewith. In an embodiment in which the data gathering devices 12 are physically attached to the field monitoring units 14, they are co-located. However, in an embodiment with the data gathering devices 12 being in short range communication with the field monitoring unit, the sensors 12 can be placed in various positions in proximity to the field monitoring unit 14, which can then aggregate and forward sensor data. In an embodiment in which the sensors 12 support long range communications, the sensors 12 can be placed anyplace and communicate either with the field monitoring units 14, directly with the aggregate monitoring unit 16 or with both, the field monitoring unit 14 and the aggregate monitoring unit 16. These sensors 12 would include a clock mechanism for time stamping their readings, a long range communications capability, and, in one embodiment an embedded GPS. However, if, in another embodiment, the sensor 12 is intended for stationary placement, the sensor 12 can be pre-programmed with a target location in advance of placement at that location.

Each field monitoring unit 14 receives data and information from a corresponding set 28 of data gathering devices 12, either wirelessly or through a wired connection. Each field monitoring unit 14 has the capability to communicate with the other field monitoring units 14 and the aggregate monitoring unit 16. Each of the field monitoring units has a feature allowing it to broadcast data it obtains from its corresponding set 28 of data gathering devices 12 to other field monitoring units 14 and the aggregate monitoring unit 16. Thus, in the preferred embodiment, each field monitoring unit 14 and the aggregate monitoring unit 16 can view data from each and every field monitoring unit 14 and, consequently, from each data gathering device 12. Thus, each field monitoring unit 14 has the capability to support global situational awareness and real time observation from other field monitoring units 14.

Figure 2:
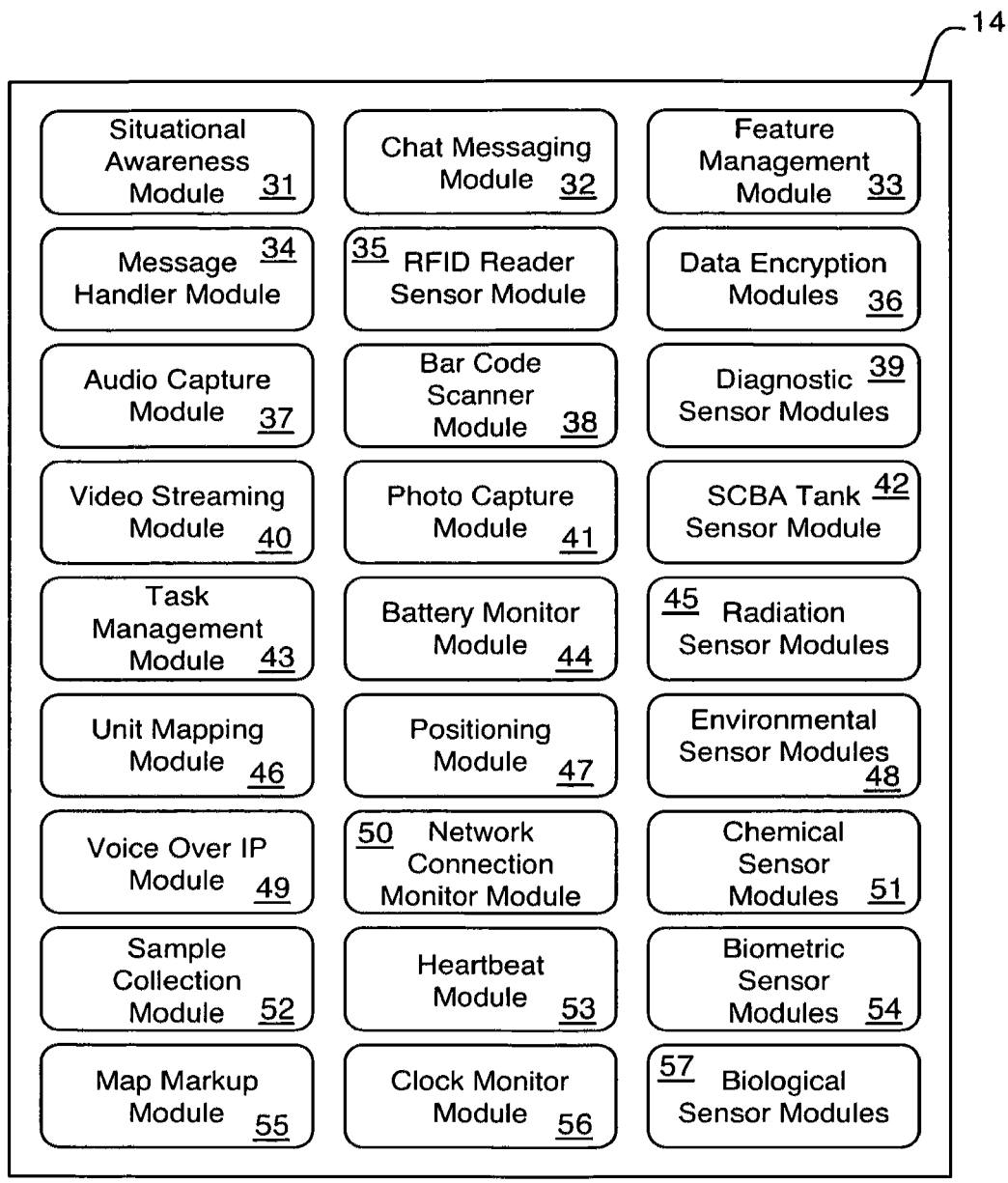
FIG. 2 is a schematic representation of a field monitoring unit of the situational awareness system of FIG. 1.

Referring to FIG. 2, the field monitoring unit 14, depending on a particular configuration, may include, but is not limited to, any combination of the following modules: situational awareness module 31, chat messaging module 32, feature management module 33, message handler module 34, RFID sensor module 35, data encryption modules 36, audio capture module 37, bar code scanner module 38, diagnostic sensor modules 39, video streaming module 40, photo capture module 41, SCBA tank sensor module 42, task management module 43, battery monitor module 44, radiation sensor module 45, unit mapping module 46, positioning module 47, environmental sensor modules 48, voice over IP module 49, network connection monitor module 50, chemical sensor modules 51, sample collection module 52, heartbeat module 53, biometric sensor modules 54, map mack up module 55, clock monitor module 56, and/or biological sensor modules 57.

Figure 3:
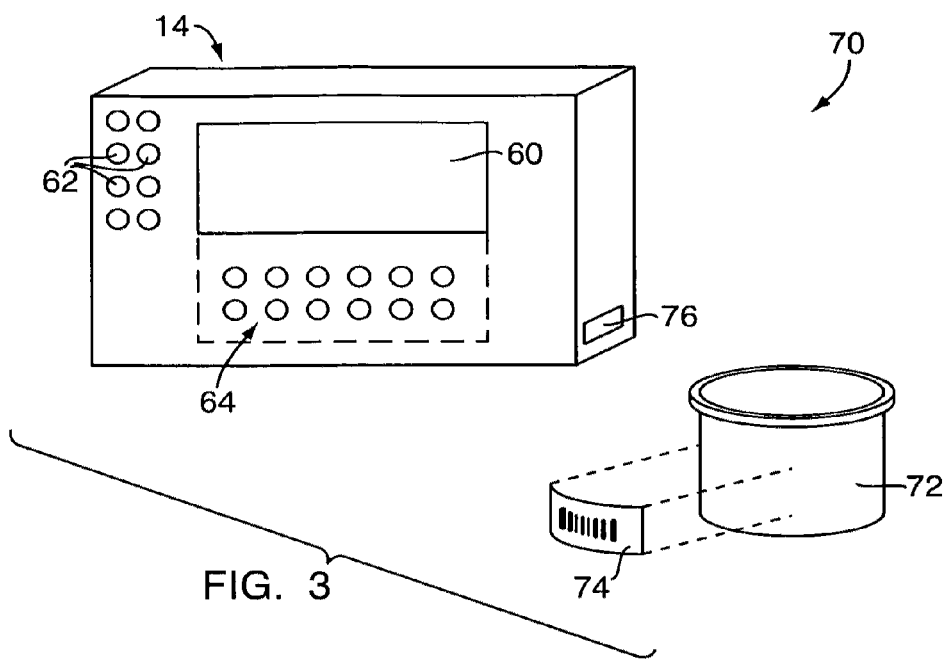
FIG. 3 is a schematic representation of a chain of custody subsystem in accordance with one embodiment of the present invention.
Figure 4:
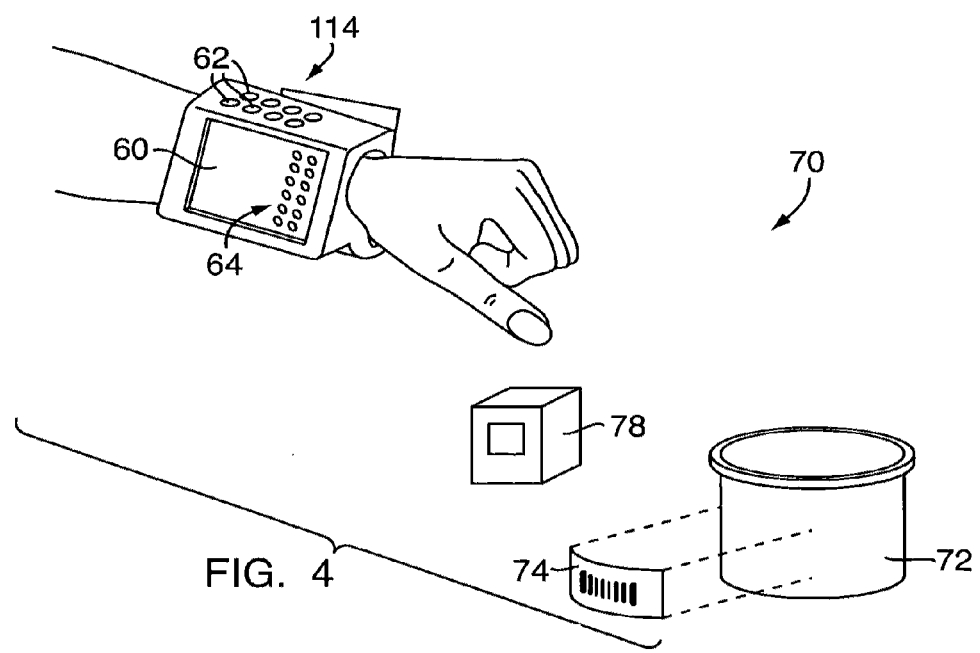
FIG. 4 is a schematic representation of a chain of custody subsystem in accordance with another embodiment of the present invention.

Referring to FIGS. 3 and 4, each field monitoring unit 14, 114 is typically a small, portable, embedded single board computing platform with primary function to support the connection of more than one sensor 12 and synthesize the data reported by the sensors and transform it into usable information. Each field monitor unit 14, 114 will preferably include a screen 60 to display information and data as shown in FIGS. 5-10. The field monitoring unit 14, 114 will also preferably include a set of preset buttons 62 and either a hardware or software keyboard 64. As shown in FIG. 3, the field monitoring unit 14, 114 can be hand held or adapted for attachment or mounting on a vehicle, such as a motorized cart or a tank, or any other platform. Alternatively, as shown in FIG. 4, the field monitoring unit 114 can be worn on a wrist. However, the field monitoring unit 14, 114 can be placed on, imbedded in or constructed to take any other form or shape.

Referring back to FIG. 1, the aggregate monitoring unit 16 aggregates and monitors data received from all of the field monitoring units 14 and, consequently, from all of the data gathering devices 12. The aggregate monitoring unit 16 collects and logs all sensor 12 readings that are collected, and subsequently broadcast, by the field monitoring unit 14 into the information repository 18. In the preferred embodiment, all sensor readings are tagged with time and location to enable post mission reporting and analysis, which can be reviewed for time critical and/or geographical perspective. Similarly, field monitoring units' 14 text messages are also collected, logged, reported, and reviewed as necessary.

The aggregate monitoring unit 16 can send messages to each of the field monitoring units 14. Messages can be sent to all units 14 simultaneously or point to point between specific units.

Figure 11:
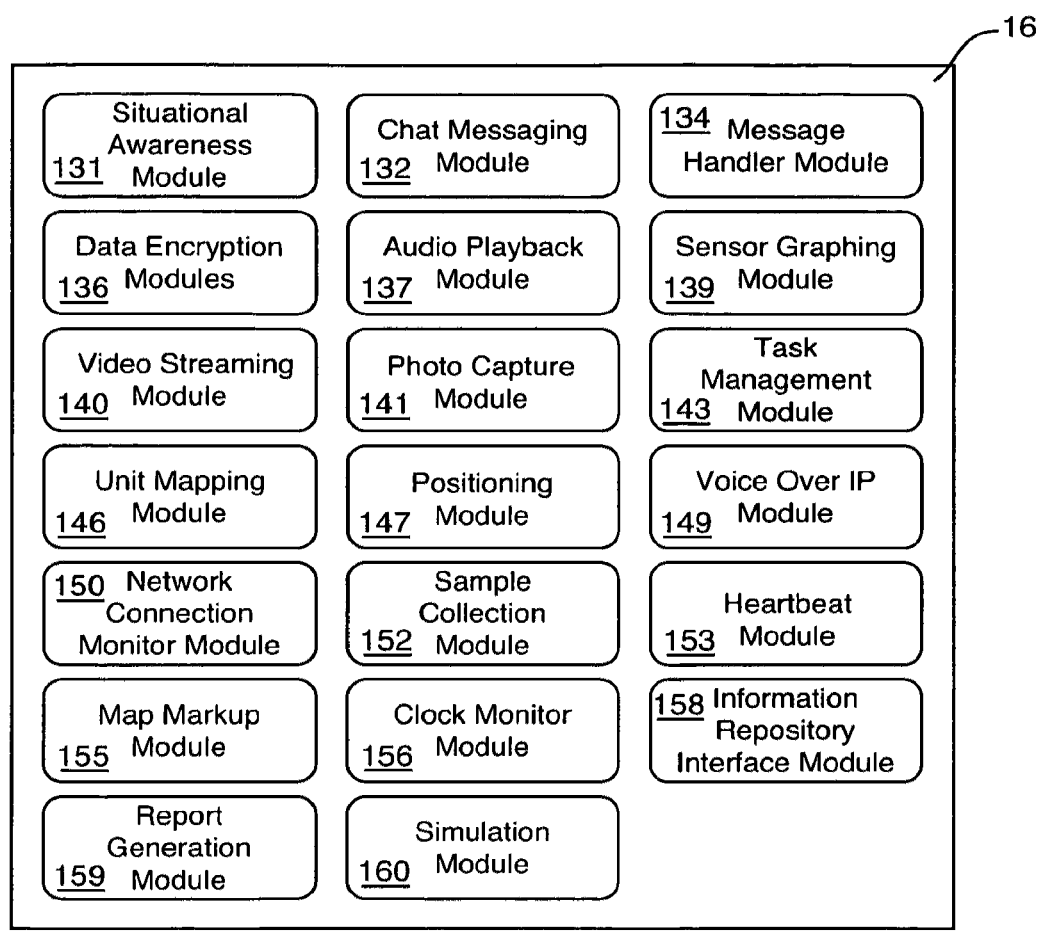
FIG. 11 is a schematic representation of an aggregate monitoring unit of the situational awareness system of FIG. 1.

Referring to FIG. 11, the aggregate monitoring unit 16, depending on a particular configuration, may include, but is not limited to, any combination of the following modules: situational awareness module 131, chat messaging module 132, message handler module 134, data encryption modules 136, audio playback module 137, sensor graphing modules 139, video streaming module 140, photo capture module 141, task management module 143, unit mapping module 146, positioning module 147, voice over IP module 149, network connection monitor module 150, sample collection module 152, heartbeat module 153, map mark up module 155, clock monitor module 156, information repository interface module 158, report generator module 159 and/or simulation module 160.

The information repository 18 is a data storage system that houses all collected data. The data is retrievable and cross referencable for analysis and reporting. The information repository 18 can reside on the same device as the aggregate monitoring unit 16 or on any other computer that is network accessible to the aggregate monitoring unit 16.

Figure 12:
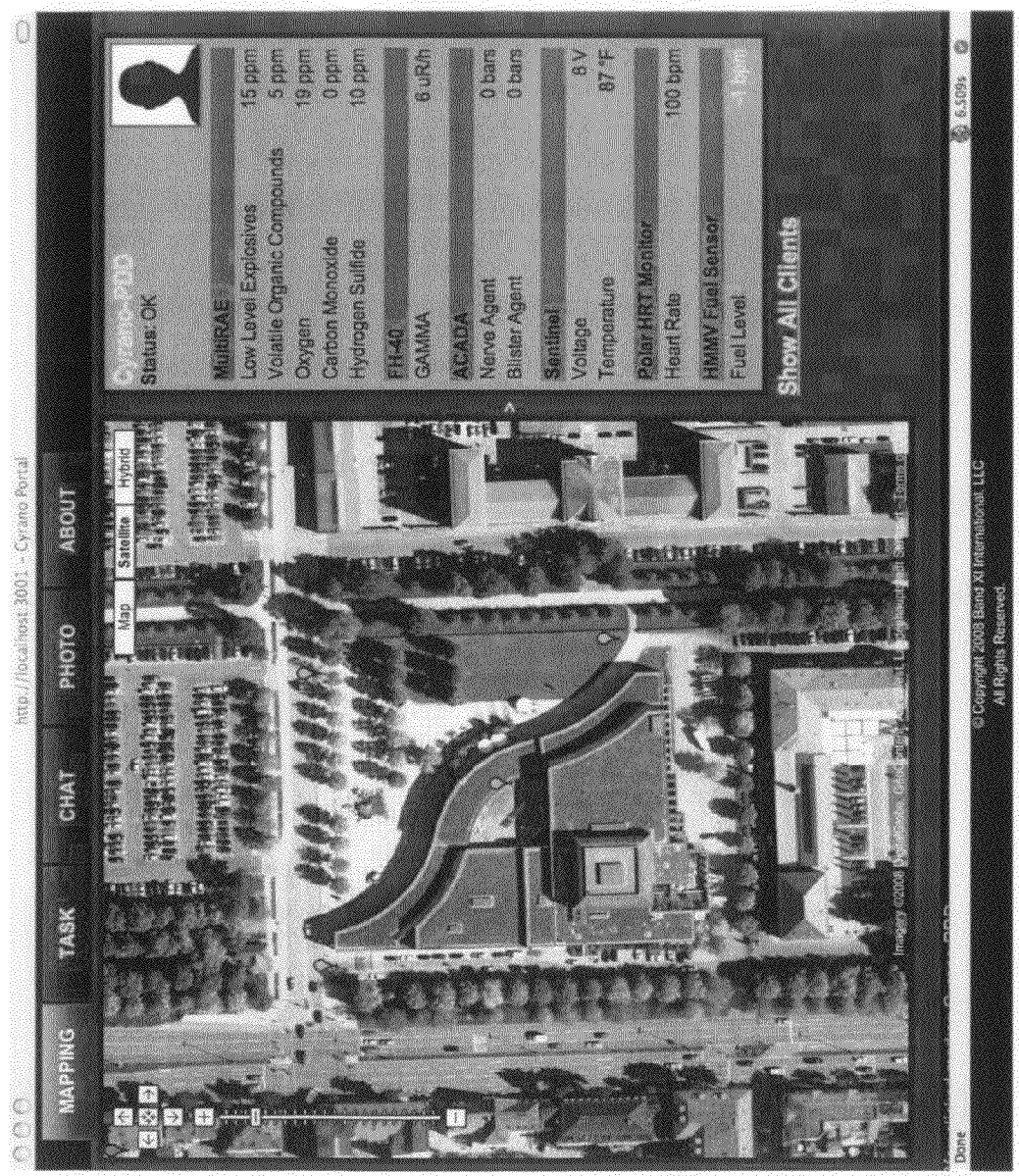
FIG. 12 is a screenshot depicting mapping and situational awareness as seen on an aggregate monitoring unit of the situational awareness system of FIG. 1.
Figure 13:
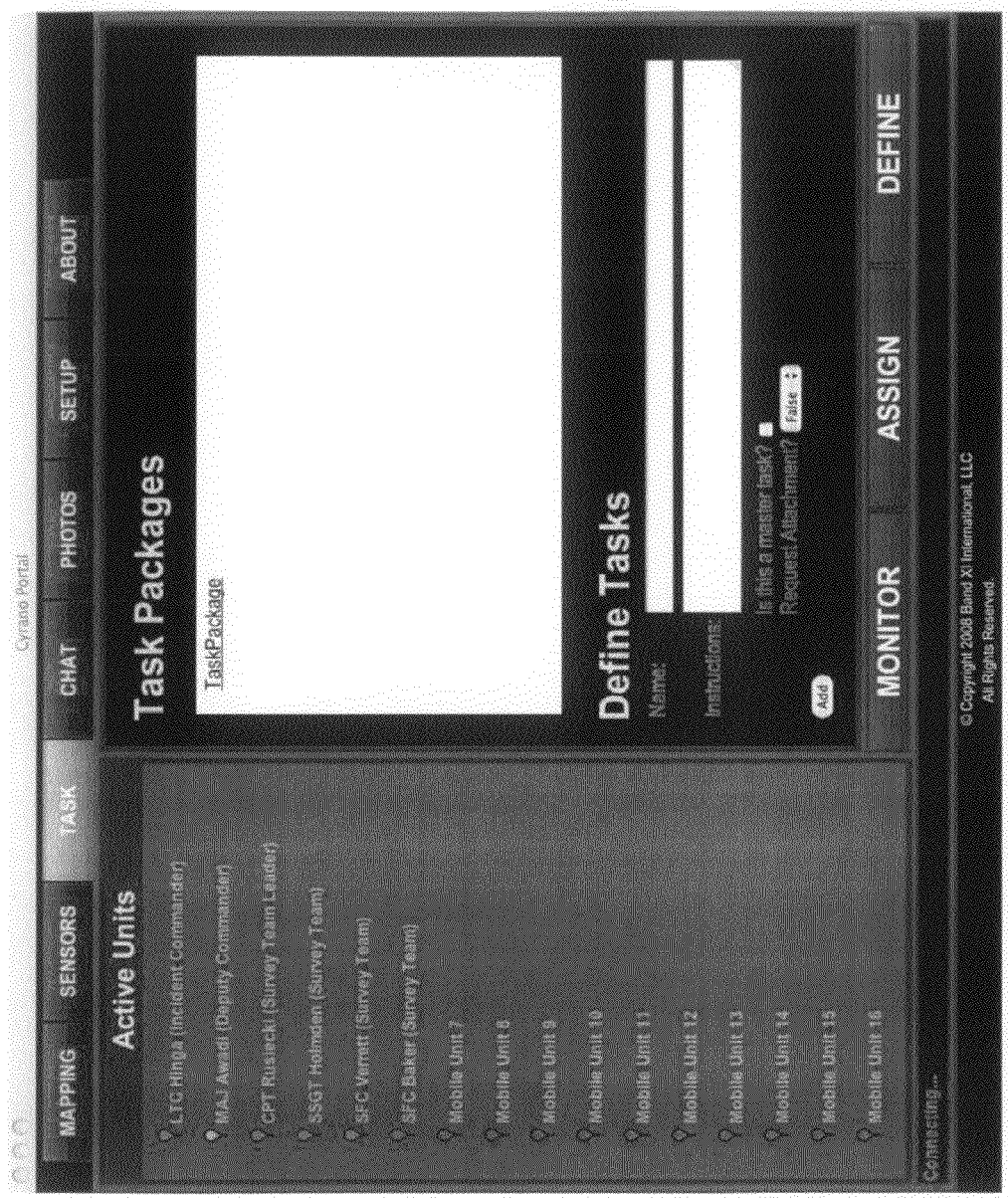
FIG. 13 is a screenshot of a task management module as seen on an aggregate monitoring unit of the situational awareness system of FIG. 1.
Figure 14:
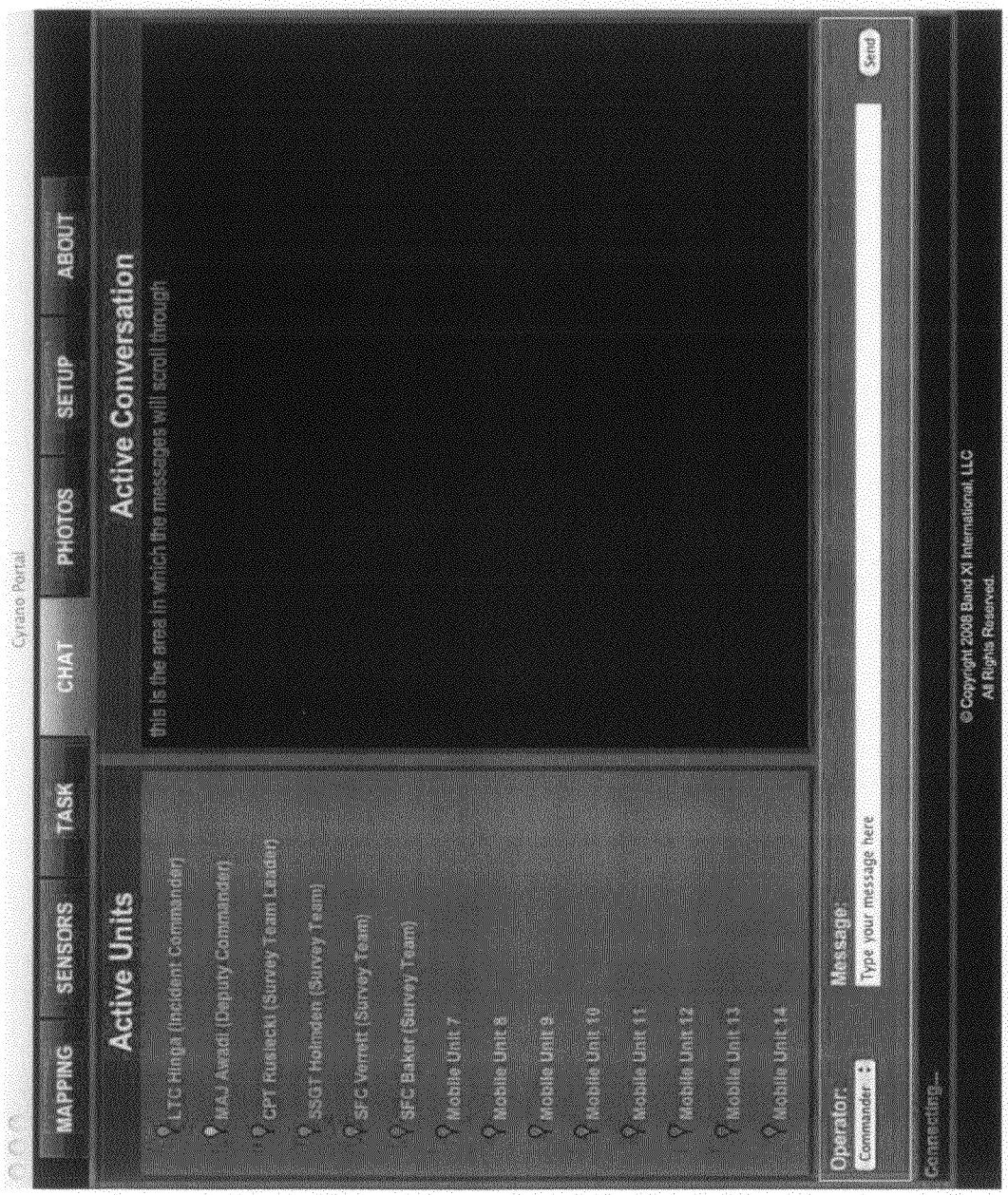
FIG. 14 is a screenshot of a chat module as seen on an aggregate monitoring unit of the situational awareness system of FIG. 1.

The web browser interface 26 provides a mechanism for users to observe the global situation, position, readings, collected data, reports, and analytical results from the aggregate monitoring unit 16. In the preferred embodiment, the web browser interface 26 runs on the aggregate monitoring unit 16 but can be viewed from any authorized computer connected remotely. The main functions typically utilized through this interface to the aggregate monitor 16 include, but are not limited to, monitoring real time sensor status and positioning of field monitoring units 14 displayed on a map, as shown in FIG. 12, reviewing historical charts and graphs of sensor readings as they vary over time and space, reviewing task management progress and status, as shown in FIG. 13, viewing digital media (photos, video, and audio clips) collected by the field monitoring units 14, as shown in FIGS. 5-10, checking on the operational status and configuration of the field monitoring unit 14 and any connected sensors 12, and/or communicating with the field monitoring unit(s) 14, as shown in FIG. 14.

The configuration management server 20 is accessible by the system administrator through the web interface 26. Using the web interface 26, the system administrator can prescribe a base system configuration of software modules for field monitoring units 14 in accordance with either a variety of application profiles or tailored for a specific field monitoring unit 14. When the field monitoring unit then comes online, the field monitoring unit identifies itself to the configuration management server 20 across the network, which then queries the configuration repository 22 to determine if the calling field monitoring unit has been correctly configured for field deployment. If a discrepancy is detected by the configuration management server 20, the configuration management server 20 then retrieves the correct software modules from the configuration repository 22 and pushes these software modules down to the field monitoring unit 14 for installation. The field monitoring unit 14 then loads these correct modules and informs the configuration server 20 of success or failure.

The configuration management server 20 also facilitates the automatic configuration and loading of software modules onto the field monitoring units 14. When a known sensor 12 is connected to the field monitoring unit 14, the field monitoring unit checks its local software library to find the supporting software module. If the necessary module is not available locally, the field monitoring unit 14 contacts the configuration management server 20, registers that the new sensor is connected and requests the necessary software to communicate and control the sensor 12. The necessary software is then transmitted over the network, preferably wirelessly, to the field monitoring unit 14, which then automatically loads and starts the software and sends a confirmation back to the configuration server that the requested software is now installed and operational.

Software engineers, building or maintaining software modules on one or more software development workstations 24 connect to the configuration management server 20 and deliver new and updated software modules than can then be provisioned to the field monitoring units 14. When field monitoring units 14 request software modules that do not exist, an automatically generated report is filed by the configuration management unit 20 and inserted into the software development workstation's 24 work queue as a problem report.

Referring to FIGS. 3 and 4, in one embodiment of the present invention, the system 10 includes a chain of custody subsystem 70 for providing a chain of custody timeline of possession and transferal of collected hazardous materials or other legally important items in the field. At least one sample container 72 would be available to a carrier of the field monitoring unit 14, 114. Additionally, either radio frequency identification (RFID) tags or barcode labels 74 would be also provided for attachment to the sample collection container 72. The field monitoring unit 14 would optionally include a scanner 76 for reading either radio frequency identification (RFID) tags or barcode labels, as shown in FIG. 3. Alternatively, as shown in FIG. 4, a standalone scanner 78 for reading either radio frequency identification (RFID) tags or barcode labels 74 would be provided.

The RFID tags or barcode labels 74 are placed on sample collection containers 72, scanned and associated with a particular sample collected. The information is logged with the aggregate monitoring unit 16 into the information repository and provides a chain of custody timeline. Thus, identifying information such as radio frequency identification (RFID) tags or barcode labels 74 will be used for sample collection tasks and can be associated with a specific task, allowing the aggregate monitoring units' observers to trace the chain of custody of sample collections to support legal requirements.

In operation, one or more sensors, or data gathering devices 12, are connected to one or more field monitoring units 14 through either a direct-wired connection or a wireless connection, as shown in FIG. 1. When the device 12 is connected to the field monitoring unit 14, the field monitoring unit 14 'discovers' the device 12 and automatically loads the necessary software component module to begin interacting with the device. This may include configuring the device, running device diagnostics, level setting or calibrating the device, and ultimately listening to the device for readings. In the event that the field monitoring unit 14 to which the device 12 is connected does not have access to the necessary supporting software module, the field monitoring unit 14 will access the configuration management server 20 across the network and request the corresponding software support.

Figure 6:
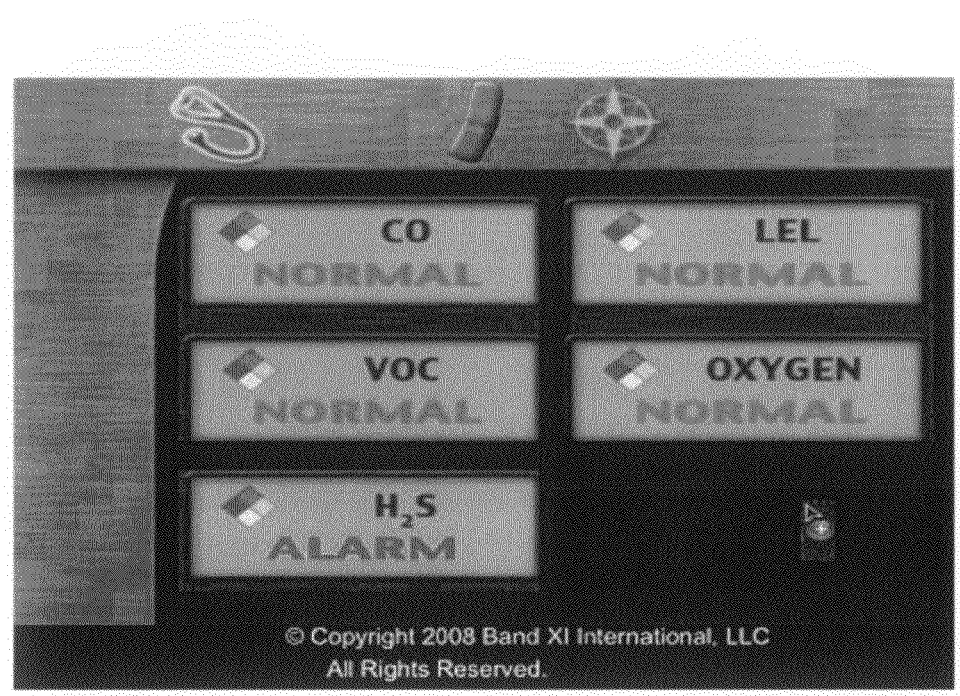
FIG. 6 is a screenshot of a sensor view on a field monitoring unit of the situational awareness system of FIG. 1.

Each field monitoring unit 14 is connected to at least two logical sensors, for example, a chemical threat sensor and a global positioning unit (GPS). In such exemplary arrangements, all chemical threat data can be tagged with location and time stamps so that its temporal and spatial significance can be considered. In an embodiment where multiple sensors 12 in a set 28 are connected to the field monitoring unit 14, as shown in FIG. 6, more complex synthesized relationships can be derived. For instance, a gas sensor detecting increasing carbon monoxide (CO) in conjunction with weather sensors indicating still air conditions at a location would provide early warning to imminent threat from an accumulation of CO. If a biometric sensor was also connected and indicated lowered blood oxygen levels in the wearer of the field monitoring unit 14, it could be deduced that the person was in danger of being overcome. Such data can be synthesized and a local warning can be communicated to the field monitoring unit 14 to which the sensors are connected.

Figure 5:
FIG. 5 is a screenshot depicting mapping and situational awareness as seen on a field monitoring unit of the situational awareness system of FIG. 1.
Figure 7:
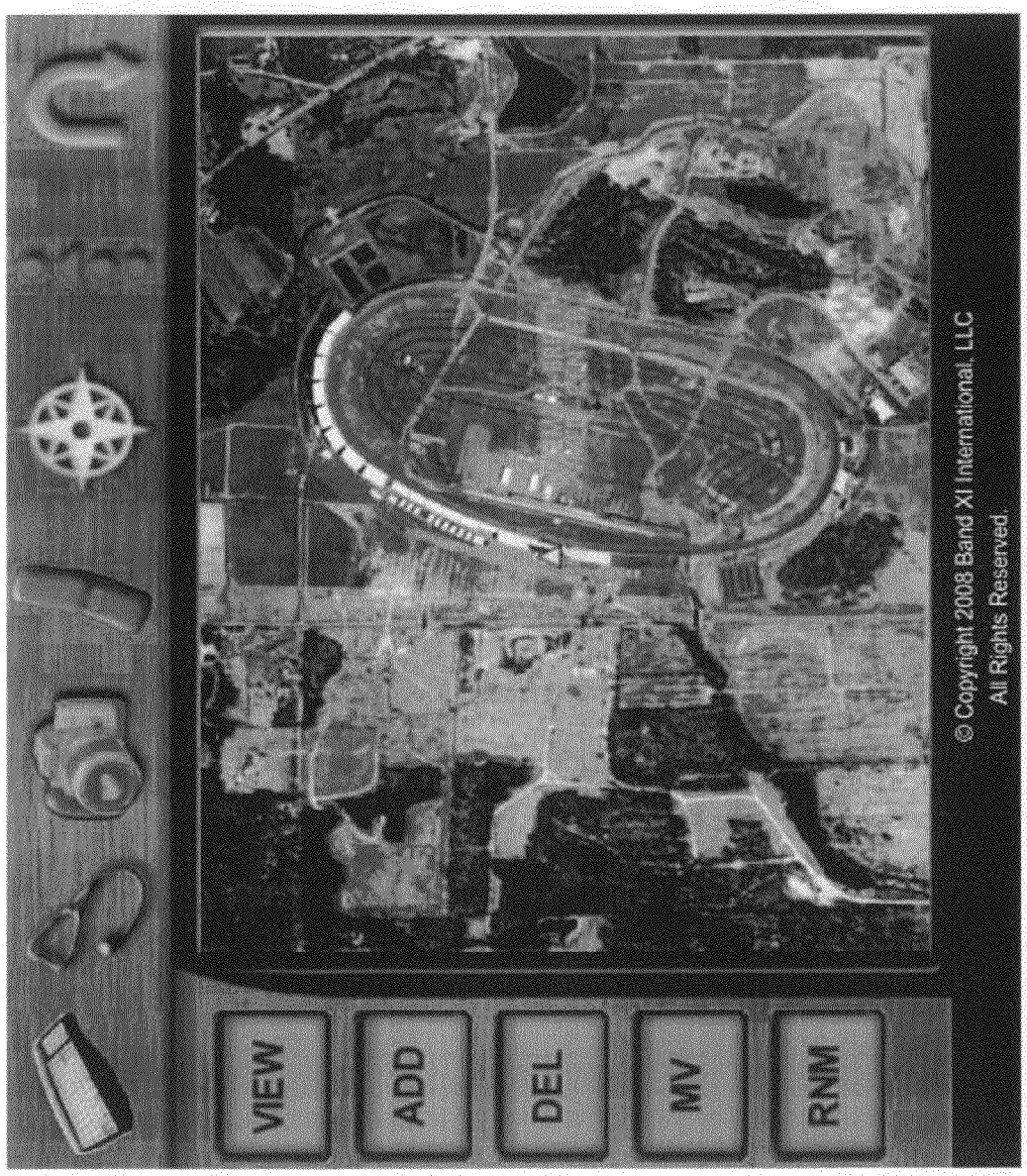
FIG. 7 is a screenshot of a map mark-up module as seen on a field monitoring unit of the situational awareness system of FIG. 1.

Beyond the immediate local information, the field monitoring units 14 also can provide global situational awareness. All field monitoring units 14 broadcast their synthesized sensor data in a multiplexed, peer-to-peer mode of operation. Each field monitoring unit 14 is made aware of the sensor 12 status of all other field monitoring units 14 on the network. As the information is tagged with location and time stamp information, it is possible to plot the sensor readings overlaid on map images to provide all operators or observers with the overall picture, as seen in FIGS. 5, 7 and 12. Each field monitoring unit 14 is shown on the map by an indicator, as seen in FIG. 5. The information is continuously broadcast over the available communications channels (WiFi, WiMax, EDGE, GPRS, etc.). With the field monitoring unit 14 indicators positioned on the map, the operator of each of the field monitoring units 14 can select an indicator for any other field monitoring unit 14 and immediately drill down to see the actual sensor reading values for any and all of the selected field monitoring unit's 14 connected sensors. Such functionality enables remote operators and managers to obtain detailed position and time tagged sensor readings without the need to communicate verbally over radio links.

The aggregate monitoring unit 16 would listen to the broadcast sensor 12 information through the field monitoring units 14 and would not only collect and display current situational readings from all field monitoring units 14 on the network, but would also log all these readings to the database repository 18. The information would also be displayed in real time as trend analysis, showing readings over time for each reporting field monitoring unit 14 and for the whole aggregate system. Additionally, the stored information would be available for after action reporting and analysis.

Various combination of modules 31-57, 131-160 may reside on field monitoring unit 14, the aggregate monitoring unit 16, or both, as shown in FIGS. 2 and 11. The message handler module 34, 134 receives messages from other field monitoring units 14 and the aggregate monitoring unit 16. First, the message handler module provides a filtering mechanism to determine whether the message received is one that the field monitoring unit on which the message handler is running has an interest in processing the message. The message handler module makes this decision by reading the message header and cross checking against the registry of modules that have registered with the message handler module for messages of the type specified in the message header. If the message is not of interest to the hosting field monitoring unit, the message is discarded. If another software module has registered an interest in receiving the message, the message is forwarded by the message handler to one or more registered modules.

The situational awareness module 31, 131 registers with the message handler for situational awareness messages. These messages contain real time information about the location and status of other field monitoring units and their attached sensor sets. The situational awareness module processes the messages and delegates the presentation of field monitoring unit status to the unit mapping module, which marks a map on the display with an icon indicating the location and status of each reporting field monitoring unit, as seen in FIGS. 5, 7 and 12.

The unit mapping module 46,146 supports a variety of viewing capabilities, such as zooming and pan and scan. The mapping of the field monitoring units can be overlaid on drawn maps or photographs that are tagged with GPS coordinates, as seen in FIGS. 5, 7 and 12. One embodiment uses maps and aerial photography available from GoogleMaps (a registered trademark of Google, Inc.). In another embodiment, Topologically Integrated Geographic Encoding and Referencing (TIGER) data is available from the US Census Bureau. However, other means and engines for obtaining such information are within the scope of the present invention. For areas in which map data is not available, it is also possible to use digitally scanned images or simple hand drawn maps that have been tagged with GPS coordinates in the corners.

The map markup module 55, 155 allows the placement of markers, or waypoints, on the map of a single field monitoring unit or the aggregate monitoring unit, which are then broadcast to all other field monitoring units and the aggregate monitoring unit, as seen in FIGS. 5, 7 and 12. In one embodiment, these markers may be simple 'x' waypoint markers with attached labels. In more complex embodiments, the map markup may be more complex overlays akin to the telestrator used in many sports broadcasts. These markers are encoded in messages and shared with all interested field monitoring units and the aggregate monitoring unit, which can simultaneously display the same markups on each of their mapping displays.

Figure 10:
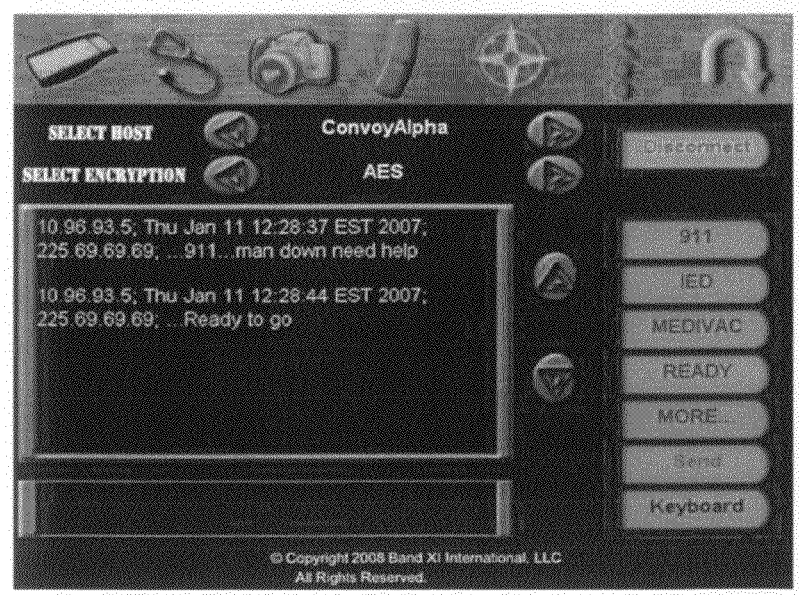
FIG. 10 is a screenshot of a chat module as seen on a field monitoring unit of the situational awareness system of FIG. 1.

The chat messaging module 32, 132 facilitates the capture, transmission, and display of text messages between field monitoring units. The user interface for this module presents a preconfigured set of messages that can be sent at the press of a button, for example, preset buttons 62, as shown in FIGS. 3 and 4 or on the screen. Alternatively, custom messages can be constructed using the field monitoring unit's or the aggregate monitoring unit's keyboard 64, or a software keyboard 64, if the field monitoring unit does not have a keyboard available, as shown in FIGS. 3 and 4. The chat messaging module receives chat messages forwarded by the message handler module and presents them in a rolling chat log on the screen, as seen in FIGS. 10 and 14.

The audio capture module 37,137 uses a microphone on the field monitoring unit to capture and stream audio data in digital form to other field monitoring unit's or the aggregate monitoring unit. Audio streams can also be stored locally on the field monitoring unit for later transmission. On the aggregate monitoring unit, the audio module can playback available audio streams received from the field monitoring units.

The photo capture module 41, 141, in one embodiment, uses a camera embedded in the field monitoring unit to capture a digital photograph. In another embodiment, it relies on a wireless camera that is paired with the field monitoring unit and wirelessly dumps all photographs onto the field monitoring unit for processing. Photographs can be automatically transmitted from the field monitoring unit to the aggregate monitoring unit or another field monitoring unit. The photo capture module also provides a user interface on the field monitoring unit that displays the photo for review that requires user intervention to perform quality review of the photo before transmitting it to the aggregate monitoring unit or another field monitoring unit.

Figure 8:
FIG. 8 is a screenshot of a photo module as seen on a field monitoring unit of the situational awareness system of FIG. 1.

The video streaming module 40, 140, in one embodiment, uses the video cameras embedded in the field monitoring unit to capture a video stream, as shown in FIG. 8, display the video stream locally on the host field monitoring unit and forward the video stream to another field monitoring unit and/or to the aggregate monitoring unit. In another embodiment, the video streaming module displays the video stream on the field monitoring unit alone or receives a video stream from another field monitoring unit. The video streaming module may also run on the aggregate monitoring unit.

Figure 9:
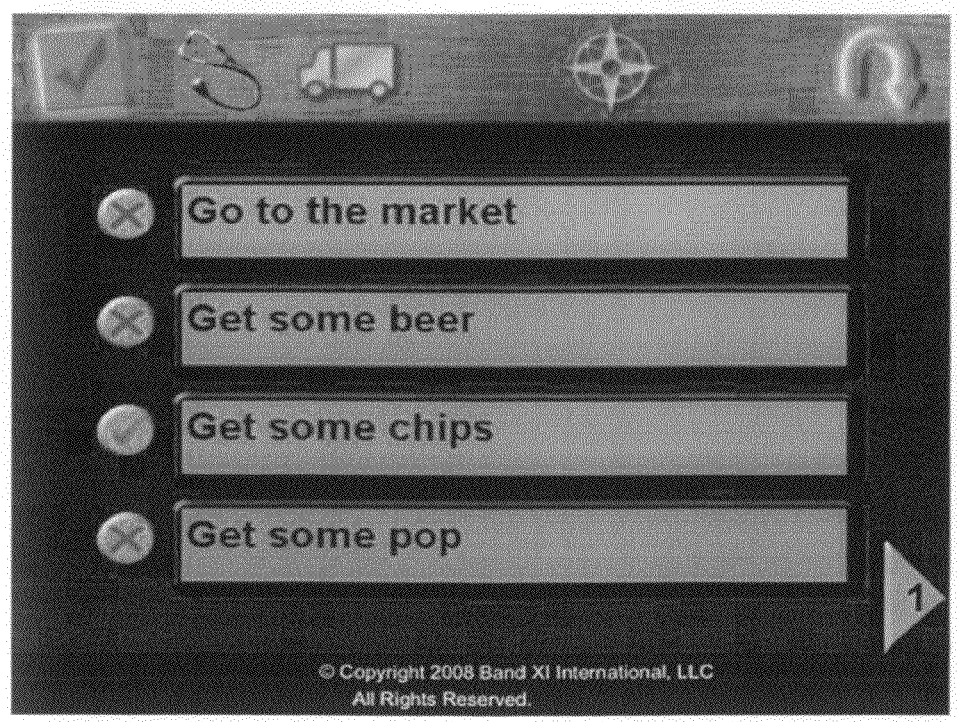
FIG. 9 is a screenshot of a task module as seen on a field monitoring unit of the situational awareness system of FIG. 1.

The task management module 43 of the field monitoring unit 14 receives task assignments from the aggregate monitoring unit, as shown in FIGS. 9 and 13. The task management module also displays these tasks, assigned from the aggregate monitoring unit to the field monitoring unit. Each task or subtask is presented with a completion indicator that can be selected when the task is completed. On selection, a task completion message is generated that indicates completion of the task at a specific time and place. Additional information, such as digital photographs, barcode or RFID tag identifications can be added as digital information to the task completion message prior to transmission back to the aggregate monitoring unit.

The aggregate monitoring unit 16 employs a richer task management and definition module 143 that assigns one or more tasks to the operator of each field monitor unit 14. Task organization is hierarchically defined, allowing tasks to have subtasks up to the depth desired by the task creator. The task management module allows real time monitoring of progress of completion of each task through communication between the aggregate monitoring unit 16 and the field monitoring unit 14. Task completion is reported to the aggregate monitoring unit 16 in real time with time stamp and location tags. This task monitoring information is also stored in the information repository 18. Sample collection identifiers, media or sensor readings including video or digital photographs can be associated with completed tasks and stored together by operators of the field monitoring units.

The voice over IP module 49, 149 provides a transport for voice communications between the field monitoring units and aggregate monitoring unit without the use of radios. Voice conversations may be held in conference call mode heard by the aggregate monitoring unit and all field monitoring units on the network, or it may be restricted to a point to point conversation between any two field monitoring units or a field monitoring unit and the aggregate monitoring unit.

The RFID sensor module 35 supports the command, control, and communication necessary for the field monitoring unit to operate in collaboration with an RFID reader 76, 78, as shown in FIGS. 3 and 4. The RFID reader detects RFID tag 74 identity information on material goods and hands that information off to the field monitoring unit for use in logistics management and tracking of hazardous or other materials. RFID tags may also be used for tagging and identifying sample collection containers 72. The tag read is combined with the time and location and transmitted as message alone or as part of a task completion message. The RFID module may also be used to write data to RFID tags in the field.

The bar code scanner module 38 supports the command, control, and communication necessary for the field monitoring unit to operate in collaboration with a bar code scanner 76, 78. The bar code scanner reads bar code 74 (or universal identifier, UID) identity information on material goods and hands that information off to the field monitoring unit for use in logistics management and tracking of hazardous or other materials. Bar codes or UID's may also be used for tagging and identifying sample collection containers 72. The bar code or UID is combined with the time and location and transmitted as a message alone or as part of a task completion message.

The sample collection module 52, 152 coordinates the capabilities of the task management module and either the RFID or bar code scanner modules to provide the necessary logging and tracking of collected samples to be in compliance with regulatory and legal requirements for tracing the chain of custody for hazardous or regulated materials and substances, including chemical, radiological, and biological items.

The battery monitor module 44 periodically checks the status of the field monitoring unit's battery, providing feedback to the field monitoring unit operator of low levels. Battery power level status is also reported to the aggregate monitoring unit through messages sent back when critical thresholds are encountered.

The positioning module 47, 147 monitors a positioning sensor to obtain the field monitoring unit's location to be used in tagging messages that will be broadcast to other field monitoring units or the aggregate monitoring unit. In one embodiment, the positioning sensor is a GPS unit. In other embodiments, the position sensor is an inertial guidance system, a pedometer, a network positioning system that uses triangulation between network nodes, or other more advanced positioning systems.

The clock monitor module 56, 156 obtains time information from an onboard clock in the field monitoring unit in one embodiment. In another embodiment, the clock monitor module obtains the time from the GPS unit.

The network connection monitor module 50, 150 monitors signal strength of the wireless network connection, available bandwidth over the connection, and the identity of the network nodes to which the field monitoring unit has been connected. The network connection monitor module, when able to connect to many networks with varying characteristics, uses assigned algorithms for selecting the best available network connection option for mission data transmission and power management requirements.

The heartbeat module 53, 153 monitors the outgoing messages from the field monitoring unit. In the event that no outgoing messages are being generated for a defined period of time, the heartbeat module will generate a simple message to inform the other field monitoring units and the aggregate monitoring unit that the host field monitoring unit is still in operation. The heartbeat message provides time and location information.

The data encryption modules 36, 136 provide support for securely encoding and decoding messages that flow to and from the field monitoring unit. The simplest data encryption module is for "clear text", which performs no transformation of the message to be transmitted. In the preferred embodiment, the field monitoring unit will include one or more FIPS 140 data encryption modules.

The diagnostic sensor modules 39, 139 are a collection of modules that enable the field monitoring unit to command, control and communicate with an arbitrary array of diagnostics sensors 12 that may be embedded in the field monitoring unit or attached to it. The sensors that may be monitored include, but are not limited to, such phenomena as impact, acceleration, vibration, and/or operating temperature.

The SCBA tank sensor modules 42 are a collection of modules that enable the field monitoring unit to command, control and communicate with self contained breathing apparatus (SCBA) sensors that may be connected to the field monitoring unit over a wired or short range wireless personal area network. The SCBA sensor typically provides monitoring of ambient temperature, tank pressure, rig voltage, and personal alert safety system (PASS).

The biometric sensor modules 54 are a collection of modules that enable the field monitoring unit to command, control and communicate with an arbitrary array of biometric sensors that may be connected to the field monitoring unit over a wired or short range wireless personal area network. The sensors that may be monitored include, but are not limited to, body temperature, blood oxygen level, pulse, hydration, and/or breathing rate.

The environmental sensor modules 48 are a collection of modules that enable the field monitoring unit to command, control and communicate with an arbitrary array of environmental sensors that may be connected to the field monitoring unit over a wired or short range wireless personal area network. The sensors that may be monitored include, but are not limited to, ambient temperature (wet bulb and dry bulb), air flow or wind speed, humidity, barometric pressure, and/or solar radiation.

The biological threat sensor modules 57 are a collection of modules that enable the field monitoring unit to command, control and communicate with an arbitrary array of biological threat detection sensors that may be embedded in the field monitoring unit or attached to it.

The chemical threat sensor modules 51 are a collection of modules that enable the field monitoring unit to command, control and communicate with an arbitrary array of chemical threat detection sensors that may be embedded in the field monitoring unit or attached to it. The sensors that may be monitored include, but are not limited to, hydrogen cyanide, carbon monoxide, chlorine, lower explosive limits, oxygen levels, sulfur dioxide, nitrogen dioxide, ammonia, volatile organic compounds (VOC), hydrogen sulfide, nitric oxide, and/or phosphine.

The radiological threat sensor modules 45 are a collection of modules that enable the field monitoring unit to command, control and communicate with an arbitrary array of biological threat detection sensors that may be embedded in the field monitoring unit or attached to it. The sensors that may be monitored include, but are not limited to, alpha, beta, gamma, and/or x-ray emission detection sensors.

The feature management module 33 is a bootstrapping module that exists at startup of the field monitoring unit to manage the loading of all other modules, including ensuring that their prerequisite modules are loaded successfully. The feature management module also manages all interactions and communications with the configuration management server on behalf of the field monitoring unit.

The information repository interface module 158 provides a means for the aggregate monitoring unit 16 to store and retrieve information from the information repository 18.

The report generation module 159 utilizes the functions available from the repository interface module 158 to retrieve information from the information repository 18 to assemble standard and custom reports for administrative purposes. These reports may be assembled and generated in printable format, or made available for online review using the web browser interface 26.

The simulation module 160 utilizes the information repository interface module 158 and elements of the report generation module 159 to playback selected information previously gathered during real operations that can be used for simulation, testing, and training. The simulation module 160 is capable of broadcasting the information so that it appears that it is being generated and broadcast by the aggregate monitoring unit 16 or any number of field monitoring units 14.

Although various devices would be suitable for use as field monitoring units 14 in system 10, the Catcher 1.0, 1.1, or 2.0 devices manufactured by Catcher Inc. of 44084 Riverside Parkway, Leesburg, Va. is one example of a suitable field monitoring unit 14 in system 10. Another device suitable for use as a field monitoring unit is Arcom Zypad WL10xx Commercial or Zypad WR11xx Ruggedized wrist mountable computer, manufactured by Eurotec and distributed by Arcom Control Systems, Inc. of 7500 West 161st Street, Overland Park, Kans.

Although various devices would be suitable for use as an aggregate monitoring unit 16 in system 10, Itronix GoBook Notebooks or Tablet Computers (several models) manufactured by General Dynamics Itronix Corporation of 12825 East Mirabeau Parkway Spokane Valley, Wash. are examples that would be suitable for use as an aggregate monitoring unit 16 in system 10. Another device suitable for use as an aggregate monitoring unit is Panasonic ToughBooks (several models) manufactured by Panasonic Corporation of North America of One Panasonic Way, Secaucus, N.J.

Although numerous devices would be suitable for use as chemical sensors in system 10, a MultiRAE Plus device manufactured by RAE Systems of 3775 North First Street, San Jose, Calif. is one example of a suitable chemical sensor for use in system 10.

Although numerous devices would be suitable for use as SCBA sensors in system 10, the AirBoss Sentinel device manufactured by Draeger Safety Inc. of 101 Technology Drive, Pittsburgh, Pa. is one example of a suitable SCBA monitor for use in system 10.

Although various network infrastructures would be suitable for use as a wireless network infrastructure in system 10, Rajant Breadcrumb Mesh Network (comprised of various combinations of their ME, SE, and LE devices) that is available from Rajant Corporation of 400 E. King Street, Malvern, Pa. is one example of a suitable network infrastructure for use in system 10. Another suitable network infrastructure is available from Vivato Directed Network, acquired by Catcher Catcher Inc. of 44084 Riverside Parkway, Leesburg, Va.

The field monitoring units 14 can be deployed in numerous settings. For example, although not limited to such examples, the field monitoring units 14 can be affixed to a sensor or collection of sensors and deployed to fixed locations, either openly or concealed, mounted to ground, air, and sea vehicles and connected to the vehicle bus and diagnostic systems, strapped to field operators as wrist, forearm, vest, pack or helmet mounted units, or carried by hand or in a pouch or pocket.

The field monitoring unit and the aggregate monitoring unit contain one or more off board communications capabilities, depending on mission and configuration needs. The unit could be capable of communicating with other units through any number of currently and future available networks, including but not limited to:

- 802.11x WiFi and mesh networking;
- 802.15.4 Zigbee mesh networking;
- 802.16 WiMax broadband wireless networking;
- GSM/GPRS wireless broadband low-bandwidth networking;
- EDGE/3G broadband high bandwidth wireless networking;
- Public safety radio networking;
- Force Battle Command Brigade and Below (FBCB2); or other military radio networks (e.g., MCS, ASAS, AFATDS, AMDWS, CSSCS).

One main advantage of system 10 is to provide real time global situational awareness of all sensor readings and unit status to all field monitoring units.

Another important advantage is that the system 10 of the present invention relieves the soldier or first responder deployed with the field monitoring unit of the burden of juggling many individual sensors, reading each sensor's unique display, and radioing back the readings to an incident commander. The incident commander can automatically view any and all data from the field monitoring units 14 on the aggregate monitoring unit 16.

Another advantage of the system is that it provides soldiers and first responders with multiple means of inter-unit communication in a single device, whether via voice over IP, chat messaging, streaming video, or simply observation of temporal position and sensor readings.

Another advantage of this system is to combine many sensor inputs, such as position, chemical levels, photographs, with operational task assignments to provide context for the information collected.

Another advantage of the system is to warehouse all collected mission data, such as positions, times, hazardous material sensor readings, task step completions, and inter-unit communications for later review for necessary safety, legal, and operational assessments.

A further advantage of the system is the ability to monitor soldier or first responder stress levels through the biometric sensors in concert with the readings of environmental and hazardous materials sensor readings to gauge the soldier or first responder's critical health situation and relieve him/her before being overcome.

Another advantage of the system is that the field monitoring unit facilitates faster, more informed distributed decision making, as field units are fully aware of one another and do not encounter the information lag that would normally occur if all information is routed through an incident command hub as a bottleneck.

A further advantage of the system is that it provides remote management and deployment of software to the field monitoring units on an as-needed basis, allowing real time reconfiguration of the field monitoring units based on which sensors are actually connected.

Another advantage of the system is that the system 10 is modular and can be deployed in a configuration required for a particular need. For example, the system 10 may include either some or all functionality (i.e. sensors 12, modules) described above. Thus, only some modules and/or sensors can be included, depending on the application and implementation.

A further advantage is that a subsystem of system 10 can be deployed to implement chain of custody logging in support of future prosecution within the legal system.

Although this invention has been shown and described with respect to the detailed embodiments thereof, it will be understood by those skilled in the art that various changes in form and detail thereof may be made without departing from the spirit and the scope of the invention.

What is claimed is:

1. A system for implementing a situational awareness comprising:
   a plurality of data gathering devices for observing physical environment and transforming physical into digital information;
   a plurality of field monitoring units with each of the plurality of field monitoring units communicating with a corresponding plurality of data gathering units to obtain data therefrom; and
   an aggregate monitoring unit communicating with each of the plurality of field monitoring units to monitor and control each of the plurality of field monitoring units and collect data from the plurality of data gathering devices;
   wherein each of the plurality of field monitoring units communicates with each other.

2. The system according to claim 1 wherein the field monitoring units are operable to instant message among themselves.

3. The system according to claim 1 wherein each of the plurality of field monitoring units broadcasts the data obtained from the corresponding plurality of data gathering devices to other monitoring units and to the aggregate monitoring unit.

4. The system according to claim 1 wherein the aggregate monitoring unit can send a task instruction to at least one of the plurality field monitoring units.

5. The system according to claim 4 wherein the task instruction is a predefined set of instructions.

6. The system according to claim 4 wherein the task instruction is a custom set of instructions.

7. The system according to claim 1 wherein each of the plurality of field monitoring units includes an identity.

8. The system according to claim 1 wherein each of the plurality of field monitoring units includes location information.

9. The system according to claim 8 wherein the location information embedded in the field monitoring unit.

10. The system according to claim 8 wherein the location information is provided by one of the plurality of the data gathering devices.

11. The system according to claim 1, wherein each of the plurality of field monitoring units includes a time stamp.

12. The system according to claim 11 wherein the time stamp information is embedded in the field monitoring unit.

13. The claim according to claim 11 wherein the time stamp information is provided by one of the plurality of the data gathering devices.

14. The system according to claim 1 wherein at least one of the plurality of data gathering devices is a hazardous materials sensor.

15. The system according to claim 1 wherein at least one of the plurality of data gathering devices is a biometric sensor.

16. The system according to claim 1 wherein at least one of the plurality of data gathering devices is an environmental sensor.

17. The system according to claim 1 wherein the aggregate monitoring unit records all the data from the plurality of field monitoring units.

18. The system according to claim 1 further comprising an information repository.

19. The system according to claim 1 further comprising a configuration management unit communicating with each of the plurality of field monitoring units.

* * * * *